United States Patent
Kurihashi et al.

(10) Patent No.: US 12,530,832 B2
(45) Date of Patent: Jan. 20, 2026

(54) DISPLAY CONTROL DEVICE AND DISPLAY SYSTEM

(71) Applicant: TOYOTA JIDOSHA KABUSHIKI KAISHA, Toyota (JP)

(72) Inventors: Sui Kurihashi, Sunto-gun (JP); Miki Tsujino, Nagakute (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 132 days.

(21) Appl. No.: 18/406,256

(22) Filed: Jan. 8, 2024

(65) Prior Publication Data
US 2024/0273799 A1    Aug. 15, 2024

(30) Foreign Application Priority Data
Feb. 9, 2023   (JP) ................................. 2023-018746

(51) Int. Cl.
G06T 13/00   (2011.01)
B60K 35/81   (2024.01)
G06T 13/80   (2011.01)

(52) U.S. Cl.
CPC .............. *G06T 13/80* (2013.01); *B60K 35/81* (2024.01); *B60K 2360/171* (2024.01)

(58) Field of Classification Search
None
See application file for complete search history.

(56) References Cited

U.S. PATENT DOCUMENTS

| | | | | |
|---|---|---|---|---|
| 8,692,739 | B2 * | 4/2014 | Mathieu | B60K 35/233 382/104 |
| 10,096,067 | B1 * | 10/2018 | Slusar | G06Q 40/08 |
| 10,688,997 | B2 * | 6/2020 | Habu | B60W 30/0956 |
| 10,740,850 | B1 * | 8/2020 | Slusar | G06Q 40/08 |
| 11,702,096 | B1 * | 7/2023 | Wells | B60W 50/14 340/435 |
| 2004/0084569 | A1 * | 5/2004 | Bonutti | B64C 23/005 244/204 |
| 2017/0144725 | A1 * | 5/2017 | Dasbach | G01C 21/36 |
| 2019/0129440 | A1 * | 5/2019 | Borhan | G05D 1/0223 |
| 2019/0130765 | A1 * | 5/2019 | Tulpule | G08G 1/22 |
| 2020/0216069 | A1 * | 7/2020 | Elflein | B60W 50/0097 |
| 2021/0224553 | A1 * | 7/2021 | Liu | H04N 7/18 |
| 2022/0161805 | A1 * | 5/2022 | Lee | B60K 35/22 |
| 2023/0349709 | A1 * | 11/2023 | Nagata | G08G 1/096844 |

FOREIGN PATENT DOCUMENTS

JP    2021-109582 A    8/2021

* cited by examiner

*Primary Examiner* — Martin Mushambo
(74) *Attorney, Agent, or Firm* — Oliff PLC

(57) ABSTRACT

A display control device includes a surrounding information acquisition unit that acquires surrounding information around a host vehicle, a preceding vehicle information acquisition unit that acquires, based on the surrounding information, preceding vehicle information on a preceding vehicle that travels in front of a driving lane of the host vehicle, an effect calculation unit that calculates, based on the preceding vehicle information, effect information on a slipstream of the preceding vehicle, and a display control unit that performs control, based on the effect information, to display the effect of the slipstream of the preceding vehicle from a preceding vehicle display unit that displays the preceding vehicle to a host vehicle display unit that displays the host vehicle.

5 Claims, 5 Drawing Sheets

DISPLAY CONTROL DEVICE AND DISPLAY SYSTEM

CROSS-REFERENCE TO RELATED APPLICATION

This application claims priority to Japanese Patent Application No. 2023-018746 filed on Feb. 9, 2023, incorporated herein by reference in its entirety.

BACKGROUND

1. Technical Field

The present disclosure relates to a display control device and a display system.

2. Description of Related Art

Japanese Unexamined Patent Application Publication No. 2021-109582 (JP 2021-109582 A) discloses a technique for displaying a vehicle front end partial image, a following target vehicle located in an area above the vehicle front end partial image, and a barometer representing an inter-vehicle distance between the following target vehicle and a host vehicle, on an information display installed in front of a driver's seat.

SUMMARY

By the way, in the display control device, it is preferable that an effect of a slipstream can be recognized.

An object of the present disclosure is to obtain a display control device that can recognize an effect of a slipstream.

A display control device according to claim 1 includes a surrounding information acquisition unit that acquires surrounding information around a host vehicle, a preceding vehicle information acquisition unit that acquires, based on the surrounding information, preceding vehicle information on a preceding vehicle that travels in front of a driving lane of the host vehicle, an effect calculation unit that calculates, based on the preceding vehicle information, effect information on a slipstream of the preceding vehicle, and a display control unit that performs control, based on the effect information, to display an effect of the slipstream of the preceding vehicle from a preceding vehicle display unit that displays the preceding vehicle to a host vehicle display unit that displays the host vehicle.

In the display control device according to claim 1, by providing a display control unit that performs control, based on the effect information on the slipstream of the preceding vehicle, to display the effect of the slipstream of the preceding vehicle from a preceding vehicle display unit that displays the preceding vehicle to a host vehicle display unit that displays the host vehicle, the effect of the slipstream is displayed from the preceding vehicle display unit to the host vehicle display unit. Therefore, the effect of the slipstream is displayed by imitating wind. As a result, the effect of the slipstream can be recognized.

In the display control device according to claim 2, in the display control device according to claim 1, the display control unit performs control to display the effect of the slipstream of the preceding vehicle in an animation that moves from the preceding vehicle display unit toward the host vehicle display unit.

In the display control device according to claim 2, the display control unit performs control to display the effect of the slipstream of the preceding vehicle in the animation that moves from the preceding vehicle display unit toward the host vehicle display unit, such that the effect of the slipstream is displayed in the animation that imitates a flow of the wind. Therefore, it is possible to easily recognize that the effect of the slipstream is occurring.

In the display control device according to claim 3, in the display control device according to claim 2, the display control unit performs control to display a moving speed of the animation faster as the effect of the slipstream becomes larger.

In the display control device according to claim 3, the display control unit performs control to display the moving speed of the animation faster as the effect of the slipstream becomes larger, such that the moving speed of the animation is displayed faster when the effect of the slipstream is large, and the moving speed of the animation is displayed slower when the effect of the slipstream is small. Therefore, it is possible to easily recognize the magnitude of the effect of the slipstream.

In the display control device according to claim 4, in the display control device according to claim 2 or 3, the display control unit performs control to display the animation in a larger size as the effect of the slipstream becomes larger.

In the display control device according to claim 4, the display control unit performs control to display the animation in a larger size as the effect of the slipstream becomes larger, such that the animation is displayed in a larger size when the effect of the slipstream is large, and the animation is displayed in a smaller size when the effect of the slipstream is small. Therefore, it is possible to easily recognize the magnitude of the effect of the slipstream.

A display system according to claim 5 includes the display control device according to any one of claims 1 to 4 and a display unit provided in front of a driver's seat in a vehicle cabin and displays an image controlled by the display control device.

The display system according to claim 5 includes the display unit provided in front of the driver's seat in the vehicle cabin and displays the image controlled by the display control device, such that the display system displays the effect of the slipstream of the preceding vehicle in front of the driver's seat. Therefore, it is possible for a driver to easily recognize that the effect of the slipstream is occurring.

As described above, in the display control device according to the present disclosure, the effect of the slipstream can be recognized.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Hereinafter, a display system 1 including a display control device 30 according to an embodiment will be described with reference to the drawings. A phenomenon called a slipstream occurs behind a vehicle that is traveling, where air resistance is lower than normal. By moving a host vehicle into this slipstream, it is possible to reduce air resistance and reduce energy loss for traveling.

The display system 1 according to the present embodiment describes an example of displaying an effect of a slipstream caused by a preceding vehicle that travels in front of the host vehicle. Note that an arrow UP shown in FIG. 1 indicates an upper side in a vertical direction of a vehicle, an arrow RH indicates a right side in a width direction of the vehicle, and an arrow FR indicates a front side in a front-rear direction of the vehicle.

Configuration of Host Vehicle 10

Figure 1:
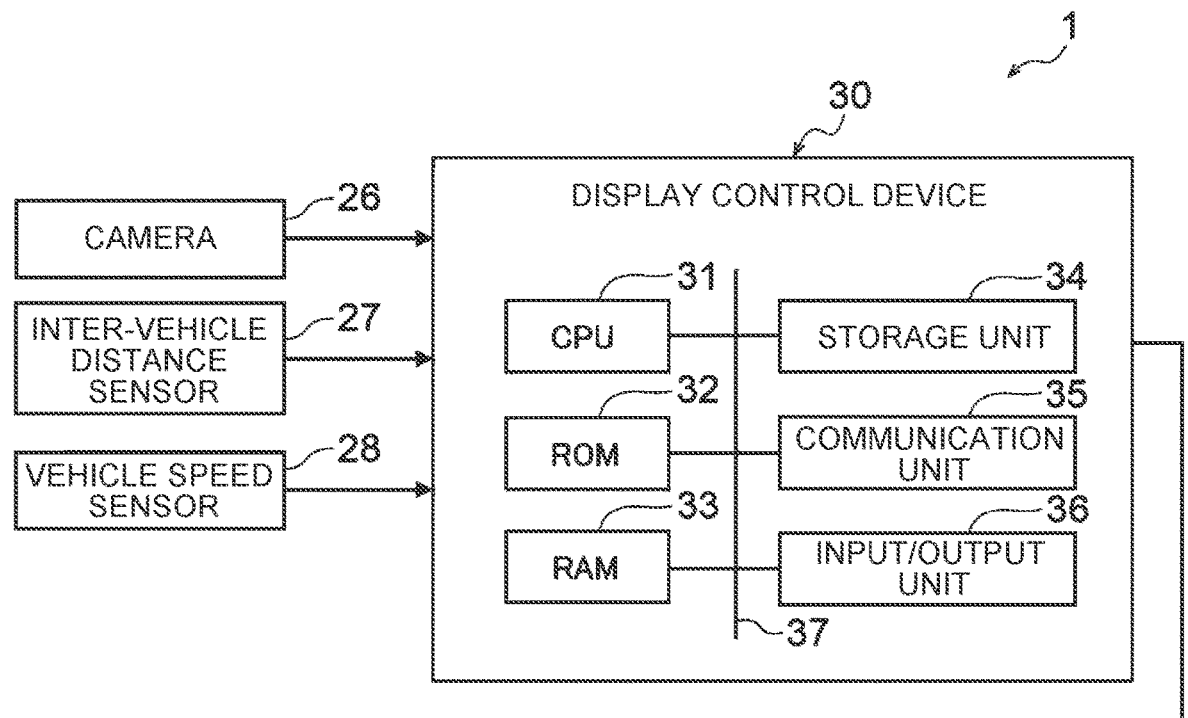
FIG. 1 is a schematic diagram schematically showing an entire system according to an embodiment.
Figure 1:
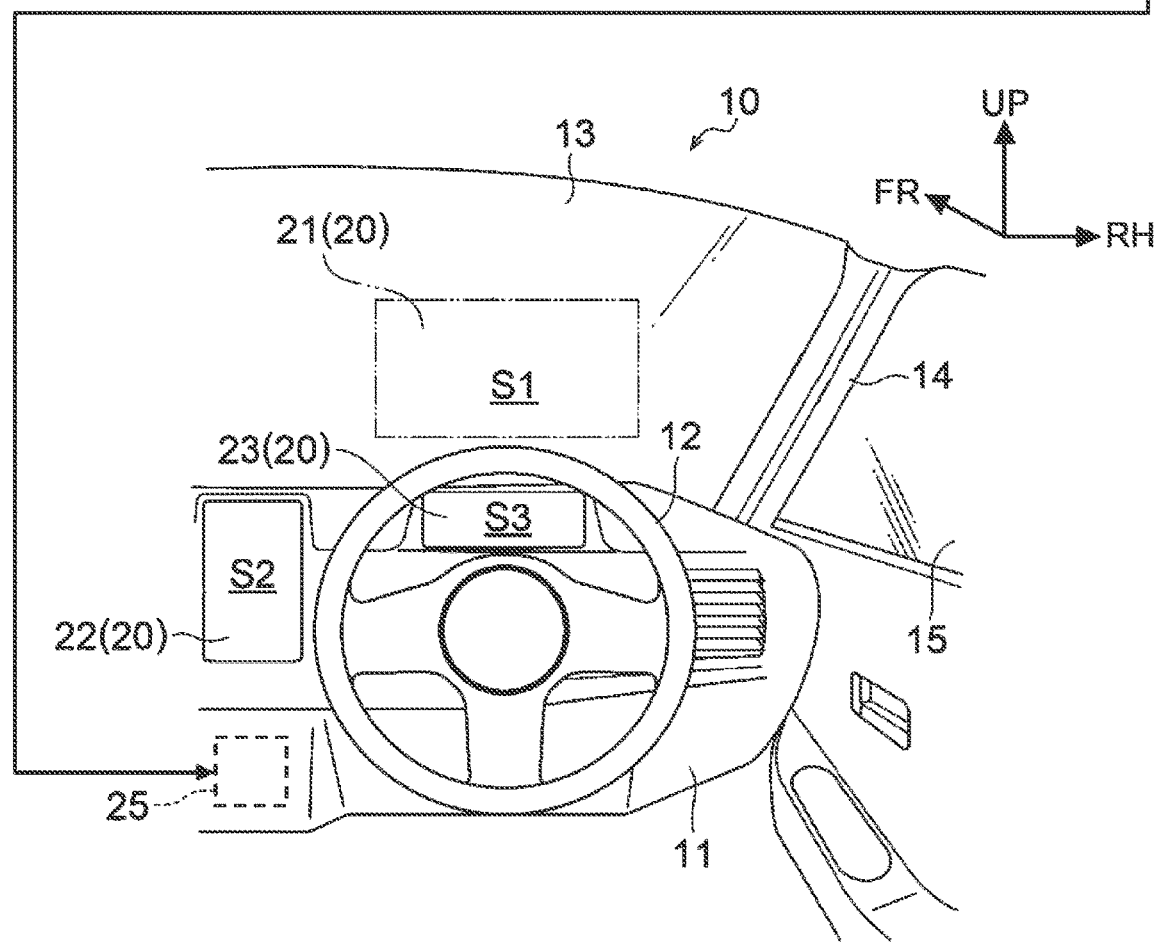

As shown in FIG. 1, an instrument panel 11 is provided at a front side of the vehicle cabin of a host vehicle 10. The instrument panel 11 extends in a width direction of the vehicle, and a steering wheel 12 is provided on the vehicle right side of the instrument panel 11.

A windshield glass 13 is provided at a front end portion of the instrument panel 11. The windshield glass 13 extends in the vertical direction of the vehicle and in the width direction of the vehicle, and partitions inside of the vehicle cabin and outside of the vehicle cabin.

A vehicle right end portion of the windshield glass 13 is fixed to a front pillar 14 on the vehicle right side. The front pillar 14 extends in the vertical direction of the vehicle, and the windshield glass 13 is fixed to an inner end portion of the front pillar 14 in the width direction of the vehicle. Further, a front end portion of a front side glass 15 is fixed to an outer end portion of the front pillar 14 in the width direction of the vehicle.

The windshield glass 13 is provided with a first display unit 21 serving as a display unit 20 that includes a display area S1 for displaying an image. The first display unit 21 is provided on a vehicle upper side of the steering wheel 12 and constitutes a projection surface projected by a head-up display device 25 serving as a display device. Specifically, on a vehicle front side of the instrument panel 11, the head-up display device 25 that is capable of projecting the image is provided so that the image is projected from the head-up display device 25 to the first display unit 21 of the windshield glass 13.

The instrument panel 11 includes a second display unit 22 serving as the display unit 20 that includes a display area S2 for displaying the image, and a third display unit 23 serving as the display unit 20 that includes a display area S3 for displaying the image. The second display unit 22 is constituted by a center display disposed at a center portion of the instrument panel 11 in the width direction of the vehicle. The third display unit 23 is constituted by a meter display provided on the vehicle front side of the driver's seat.

Configuration of Display System 1

As shown in FIG. 1, the display system 1 includes a camera 26, an inter-vehicle distance sensor 27, a vehicle speed sensor 28, the display control device 30, the head-up display device 25, and the first display unit 21.

The camera 26 is provided in the host vehicle 10 and is attached to capture an image ahead of the host vehicle 10.

The inter-vehicle distance sensor 27 is provided in the host vehicle 10 and detects the inter-vehicle distance between the host vehicle 10 and the preceding vehicle that travels in front of the host vehicle 10. Examples of the inter-vehicle distance sensor 27 include a laser radar device, a millimeter wave radar device, and the like. The vehicle speed sensor 28 is provided in the host vehicle 10 and detects a vehicle speed of the host vehicle 10.

The display control device 30 is provided in the host vehicle 10 and performs various controls. The display control device 30 can be an electronic control unit (ECU).

Hardware Configuration of Display Control Device 30

As shown in FIG. 1, the display control device 30 includes a central processing unit (CPU) 31, a read only memory (ROM) 32, a random access memory (RAM) 33, a storage unit 34, a communication unit 35, and an input/output unit 36. Each configuration is communicably connected to each other via an internal bus 37.

The CPU 31 is a central processing unit that executes various programs and controls each unit. That is, the CPU 31 reads the program from the ROM 32 or the storage unit 34 and executes the program using the RAM 33 as a work area. Further, the CPU 31 controls each of the above configurations and executes various arithmetic processing in accordance with the program recorded in the ROM 32 or the storage unit 34.

The ROM 32 stores various programs and various data. The RAM 33 temporarily stores the program or data as the work area. The storage unit 34 is a non-transitory recording medium that is constituted by a hard disk drive (HDD) or a solid-state drive (SSD) and stores various programs including an operating system and various data. In the present embodiment, the ROM 32 or the storage unit 34 stores a program for performing display control processing and the like, which will be described later.

The communication unit 35 is an interface for the display control device 30 to communicate with a server and other devices, and for example, includes a standard such as controller area network (CAN), Ethernet (registered trademark), long term evolution (LTE), fiber distributed data interface (FDDI), and Wi-Fi.

The input/output unit 36 is connected to the first display unit 21, the second display unit 22, the head-up display device 25, the camera 26, the inter-vehicle distance sensor 27, the vehicle speed sensor 28, and the like.

Functional Configuration of Display Control Device 30

In the display control device 30, a camera image captured by the camera 26, detection information detected by the inter-vehicle distance sensor 27, and detection information detected by the vehicle speed sensor 28 are input to a control unit 40 (see FIG. 2), and processing information that has undergone the display control processing in the control unit 40 is output to the head-up display device 25. In the control unit 40, the CPU 31 executes the display control processing according to the program recorded in the ROM 32 or the storage unit 34.

Figure 2:
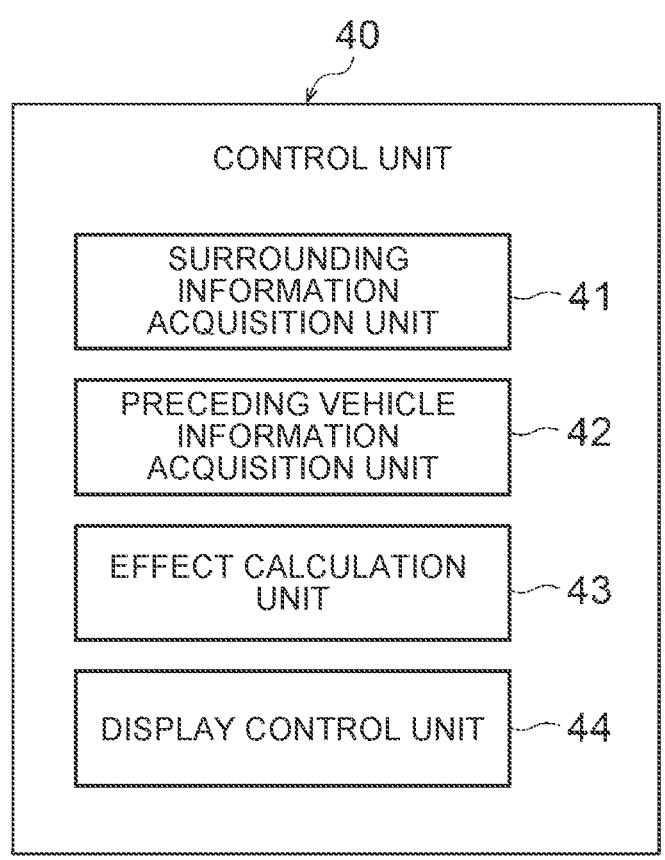
FIG. 2 is a block diagram showing a functional configuration of a display control device according to the embodiment.

As shown in FIG. 2, the control unit 40 functionally includes a surrounding information acquisition unit 41, a preceding vehicle information acquisition unit 42, an effect calculation unit 43, and a display control unit 44.

The surrounding information acquisition unit 41 acquires surrounding information around the host vehicle 10 based on the camera image captured by the camera 26.

The preceding vehicle information acquisition unit 42 acquires, based on the camera image acquired by the surrounding information acquisition unit 41, the vehicle speed of the host vehicle 10 detected by the vehicle speed sensor 28, and the inter-vehicle distance detected by the inter-vehicle distance sensor 27, the preceding vehicle information on the preceding vehicle that travels in front of the host vehicle 10 in the driving lane.

Specifically, the preceding vehicle information acquisition unit 42, for example, identifies a vehicle model of the preceding vehicle by image recognition and acquires information on the size of the preceding vehicle, based on the camera image acquired by the surrounding information acquisition unit 41. Further, the preceding vehicle information acquisition unit 42 acquires information on the vehicle speed of the preceding vehicle based on the vehicle speed of the host vehicle 10 detected by the vehicle speed sensor 28 and the change in the inter-vehicle distance detected by the inter-vehicle distance sensor 27.

The effect calculation unit 43 calculates, based on the preceding vehicle information, the effect information on a slipstream of the preceding vehicle. Furthermore, the effect calculation unit 43 determines the magnitude of the effect of the slipstream of the preceding vehicle. The effect calculation unit 43 determines that the effect of the slipstream is larger as the size of the preceding vehicle acquired by the preceding vehicle information acquisition unit 42 is larger. The effect calculation unit 43 determines that the effect of the slipstream is larger as the vehicle speed of the preceding vehicle acquired by the preceding vehicle information acquisition unit 42 is faster.

The display control unit 44 performs control, based on the effect information calculated by the effect calculation unit 43, to display the effect of the slipstream of the preceding vehicle from a preceding vehicle display unit 110A that displays the preceding vehicle to a host vehicle display unit 10A that displays the host vehicle 10.

Figure 3:
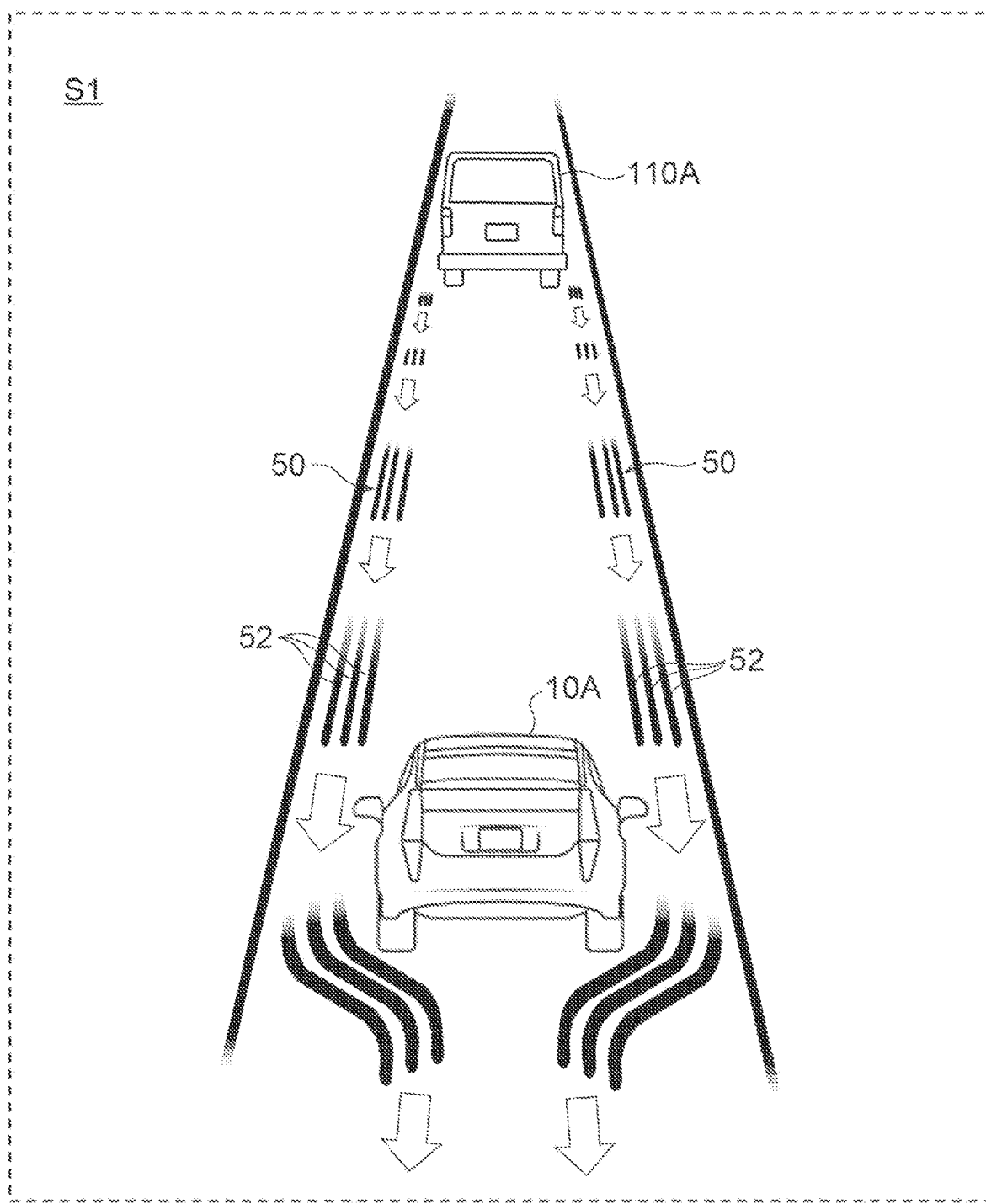
FIG. 3 is a diagram showing an example of display by the display control device according to the embodiment.

Specifically, as shown in FIG. 3, the display control unit 44 performs control to display the effect of the slipstream of the preceding vehicle from the preceding vehicle display unit 110A that displays the preceding vehicle to the host vehicle display unit 10A that displays the host vehicle 10, as an animation 50 on both sides of the host vehicle display unit 10A and the preceding vehicle display unit 110A in the width direction of the vehicles.

The display control unit 44 executes control to display the effect of the slipstream of the preceding vehicle with the animation 50 in which a mark 52 moves from the preceding vehicle display unit 110A that displays the preceding vehicle toward the host vehicle display unit 10A that displays the host vehicle 10. The mark 52 can be in a linear shape extending in the front-rear direction of the vehicle.

As shown in FIG. 3, when the effect calculation unit 43 calculates that the effect of the slipstream is large, the display control unit 44 performs control to increase the moving speed of the mark 52. In other words, when the effect calculation unit 43 calculates that the effect of the slipstream is large, the display control unit 44 performs control to increase the moving speed of the animation 50.

Further, when the effect calculation unit 43 calculates that the effect of the slipstream is large, the display control unit 44 performs control to increase the number of marks 52 in the width direction. In the example of FIG. 3, the number of marks 52 in the width direction of the vehicle is three. In other words, when the effect calculation unit 43 calculates that the effect of the slipstream is large, the display control unit 44 performs control to display the animation 50 in a larger size.

Figure 4:
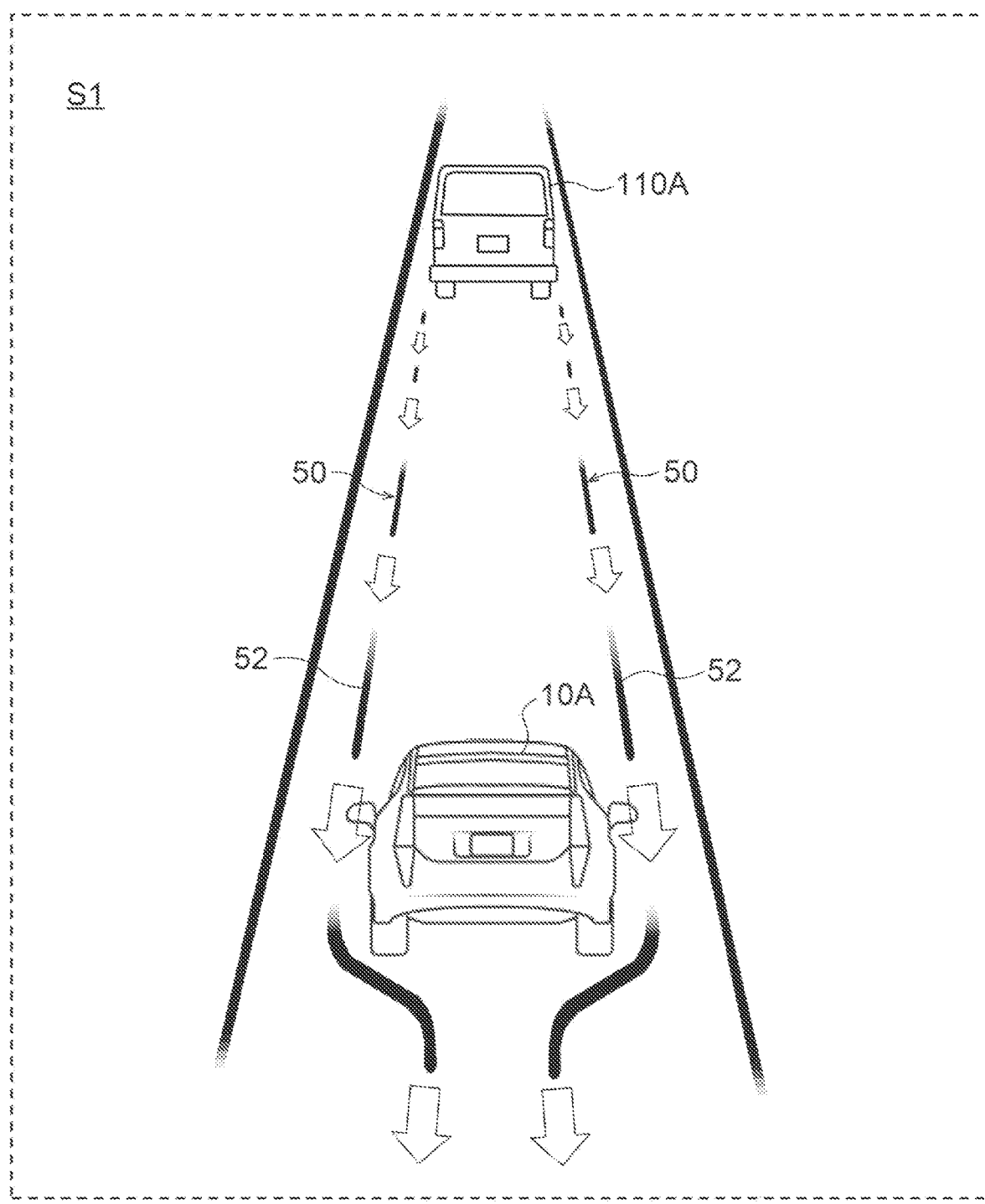
FIG. 4 is a diagram showing an example of display by the display control device according to the embodiment.

As shown in FIG. 4, when the effect calculation unit 43 calculates that the effect of the slipstream is small, the display control unit 44 performs control to decrease the moving speed of the mark 52. In other words, when the effect calculation unit 43 calculates that the effect of the slipstream is small, the display control unit 44 performs control to decrease the moving speed of the animation 50.

Further, when the effect calculation unit 43 calculates that the effect of the slipstream is small, the display control unit 44 performs control to decrease the number of marks 52 in the width direction. In the example of FIG. 4, the number of marks 52 in the width direction of the vehicle is one. In other words, when the effect calculation unit 43 calculates that the effect of the slipstream is small, the display control unit 44 performs control to display the animation 50 in a smaller size.

Flow of Display Control Processing

Figure 5:
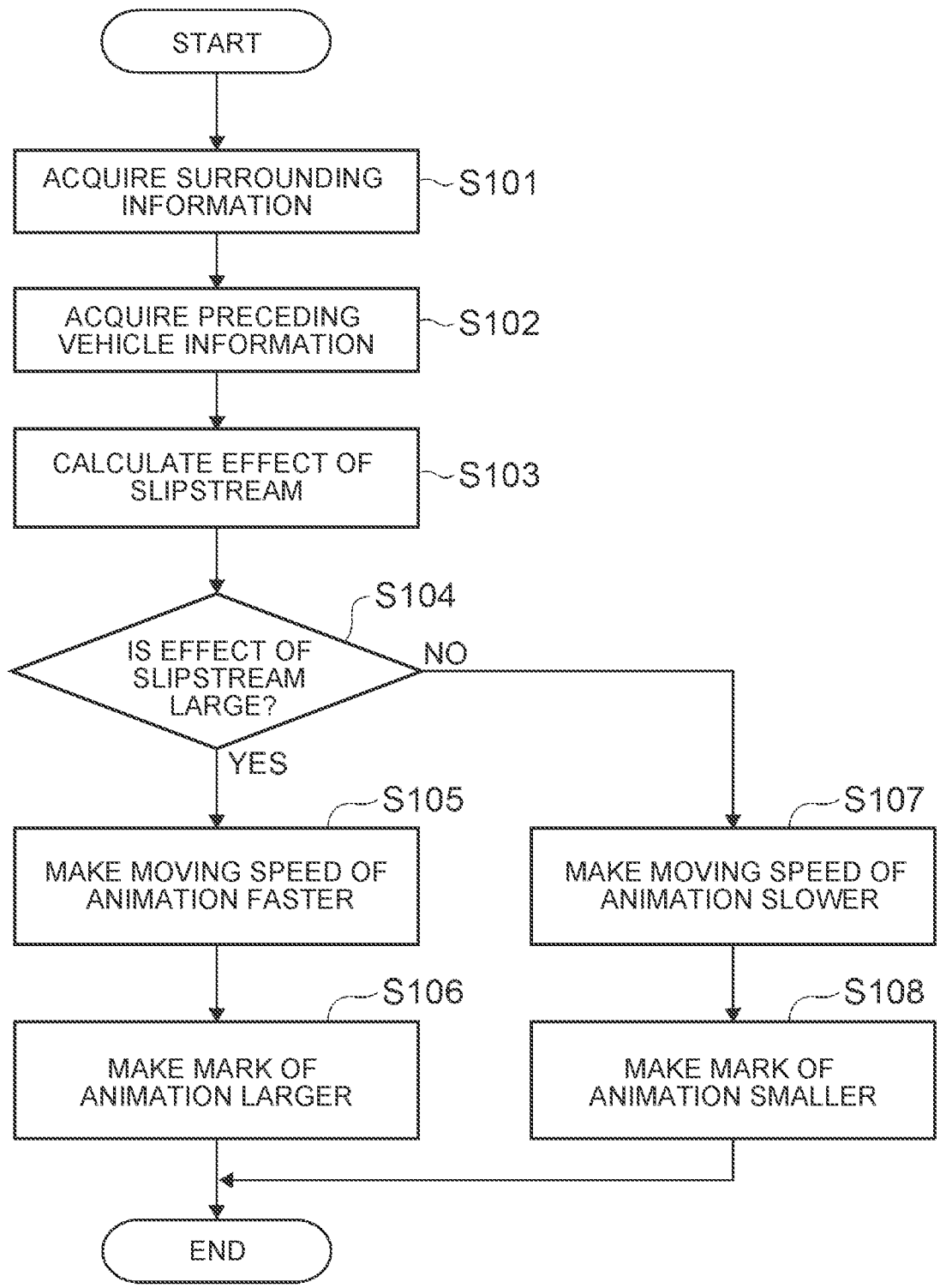
FIG. 5 is a flowchart showing a flow of processing by the display control device according to the embodiment.

As shown in FIG. 5, when the display control processing is started, the surrounding information acquisition unit 41 acquires the surrounding information around the host vehicle 10 based on the camera image captured by the camera 26 (step S101).

Then, the preceding vehicle information acquisition unit 42 acquires, based on the camera image acquired by the surrounding information acquisition unit 41, the vehicle speed of the host vehicle 10 detected by the vehicle speed sensor 28, and the inter-vehicle distance detected by the inter-vehicle distance sensor 27, the preceding vehicle information on the preceding vehicle that travels in front of the host vehicle 10 in the driving lane (step S102).

Subsequently, the effect calculation unit 43 calculates, based on the preceding vehicle information, the effect information on a slipstream of the preceding vehicle (step S103).

Next, the effect calculation unit 43 determines whether the effect of the slipstream of the preceding vehicle is large (step S104). When the effect of the slipstream of the preceding vehicle is determined to be large (YES in step S104), the display control unit 44 performs control to increase the moving speed of the animation 50 (step S105).

Next, the display control unit 44 performs control to enlarge the mark 52 of the animation 50 (step S106) and ends the display control processing.

When the effect of the slipstream of the preceding vehicle is determined to be small (NO in step S104), the display control unit 44 performs control to decrease the moving speed of the animation 50 (step S107).

Then, the display control unit 44 performs control to reduce the size of the mark 52 of the animation 50 (step S108) and ends the display control processing.

Note that when the effect calculation unit 43 calculates that there is almost no effect of the slipstream, the display control unit 44 may perform control so that the effect of the slipstream is not displayed.

Effects

A display control device 30 according to the present embodiment includes a surrounding information acquisition unit 41 that acquires surrounding information around a host vehicle 10, a preceding vehicle information acquisition unit 42 that acquires, based on the surrounding information, preceding vehicle information on a preceding vehicle that travels in front of the host vehicle 10 in a driving lane, an effect calculation unit 43 that calculates, based on the preceding vehicle information, effect information on a slipstream of the preceding vehicle, and a display control unit 44 that performs control, based on the effect information, to display an effect of the slipstream of the preceding vehicle from a preceding vehicle display unit 110A that displays the preceding vehicle to a host vehicle display unit 10A that displays the host vehicle 10 (see FIG. 3).

By providing a display control unit 44 that performs control, based on the effect information, to display the effect of the slipstream of the preceding vehicle from the preceding vehicle display unit 110A that displays the preceding vehicle to the host vehicle display unit 10A that displays the host vehicle 10, the effect of the slipstream is displayed from the preceding vehicle display unit 110A to the host vehicle display unit 10A. Therefore, the effect of the slipstream is displayed by imitating wind. As a result, the effect of the slipstream can be recognized.

In the display control device 30 according to the present embodiment, the display control unit 44 executes control to display the effect of the slipstream of the preceding vehicle in the animation 50 that moves from the preceding vehicle display unit 110A toward the host vehicle display unit 10A (see FIGS. 3 and 4).

The display control unit 44 performs control to display the effect of the slipstream of the preceding vehicle in the animation 50 that moves from the preceding vehicle display unit 110A toward the host vehicle display unit 10A, such that the effect of the slipstream is displayed in the animation 50 that imitates a flow of the wind. Therefore, it is possible to easily recognize that the effect of the slipstream is occurring.

In the display control device 30 according to the present embodiment, the display control unit 44 performs control to display the moving speed of the animation 50 faster as the effect of the slipstream becomes larger (see FIGS. 3 and 4).

The display control unit 44 performs control to display the moving speed of the animation 50 faster as the effect of the slipstream becomes larger, such that the moving speed of the animation 50 is displayed faster when the effect of the slipstream is large, and the moving speed of the animation 50 is displayed slower when the effect of the slipstream is small. Therefore, it is possible to easily recognize the magnitude of the effect of the slipstream.

In the display control device 30 according to the present embodiment, the display control unit 44 performs control to display the animation 50 in a larger size as the effect of the slipstream becomes larger (see FIGS. 3 and 4).

The display control unit 44 performs control to display the animation 50 in a larger size as the effect of the slipstream becomes larger, such that the animation 50 is displayed in a larger size when the effect of the slipstream is large, and the animation 50 is displayed in a smaller size when the effect of the slipstream is small. Therefore, it is possible to easily recognize the magnitude of the effect of the slipstream.

The display system 1 according to the present embodiment includes the display control device 30 and the first display unit 21 that is provided in front of the driver's seat in the vehicle cabin and that displays the image controlled by the display control device 30 (see FIG. 1).

By providing the display control device 30 and the first display unit 21 that is provided in front of the driver's seat in the vehicle cabin and that displays the image controlled by the display control device 30, the effect of the slipstream of the preceding vehicle is displayed in front of the driver's seat. Therefore, it is possible for the driver to easily recognize that the effect of the slipstream is occurring.

A display control method according to the present embodiment includes acquiring the surrounding information around the host vehicle 10, acquiring the preceding vehicle information that travels in front of the host vehicle 10 in the driving lane, based on the surrounding information, calculating the effect information of the slipstream of the preceding vehicle based on the preceding vehicle information, and performing control, based on the effect information, to display the effect of the slipstream of the preceding vehicle from the preceding vehicle display unit 110A that displays the preceding vehicle to the host vehicle display unit 10A that displays the host vehicle 10.

A program according to the present embodiment causes a computer to execute processing for acquiring the surrounding information around the host vehicle 10, acquiring the preceding vehicle information that travels in front of the host vehicle 10 in the driving lane, based on the surrounding information, calculating the effect information of the slipstream of the preceding vehicle based on the preceding vehicle information, and performing control, based on the effect information, to display the effect of the slipstream of the preceding vehicle from the preceding vehicle display unit 110A that displays the preceding vehicle to the host vehicle display unit 10A that displays the host vehicle 10.

The display control device 30 according to the embodiment has been described above based on the above embodiment. However, the specific configuration is not limited to this embodiment, and changes in design are permitted as long as they do not depart from the spirit of the disclosure described in each claim.

In the embodiment described above, an example was shown in which the larger the effect of the slipstream is, the faster the moving speed of the mark 52 is displayed and the larger the animation 50 is displayed. However, the configuration may be such that only the moving speed of the mark 52 is displayed faster as the effect of the slipstream becomes larger, or only the animation 50 is displayed larger as the effect of the slipstream becomes larger. Furthermore, the configuration may be such that the larger the effect of the slipstream is, the longer the mark 52 is displayed, or the thicker the mark 52 is displayed.

In the embodiment described above, an example was shown in which the mark 52 is in a linear shape extending in the front-rear direction of the vehicle. However, the mark 52 may be in any shape as long as it represents the wind. For example, the mark 52 may be in a shape extending in the width direction of the vehicle.

In the embodiment described above, an example was shown in which the effect of the slipstream of the preceding vehicle is displayed in the animation 50. However, the effect of the slipstream of the preceding vehicle may be displayed in a still image instead of the animation 50.

In the embodiment described above, an example was shown in which the image showing the effect of the slipstream of the preceding vehicle is output to the head-up display device 25 and projected onto the first display unit 21. However, the image showing the effect of the slipstream of the preceding vehicle may be output to the second display unit 22 or the third display unit 23.

In the embodiment described above, various processors other than the CPU 31 may execute the processing that is executed by the CPU 31 by reading the program. In this case, processors include a programmable logic device (PLD) that can change the circuit configuration after manufacturing such as a field-programmable gate array (FPGA), and a dedicated electric circuit that is a processor including a circuit configuration specifically designed to execute a specific process such as an application specific integrated circuit (ASIC), and the like. Further, the processing described above may be executed by one of the various processors, or a combination of two or more processors of the same category or different categories, for example, a plurality of FPGAs and a combination of a CPU and a FPGA. Further, a hardware structure of the various processors is, more specifically, an electric circuit in which circuit elements such as semiconductor elements are combined.

In the embodiment described above, the storage unit 34 is constituted to store various data, but the present disclosure is not limited to this. For example, a storage unit may be a non-transitory recording medium such as a compact disk (CD), a digital versatile disk (DVD), and a universal serial bus (USB) memory. In this case, various programs, data, and the like will be stored in these recording media.

What is claimed is:

1. A display control device comprising:
 a processor programmed to:
  acquire surrounding information around a host vehicle;
  acquire, based on the surrounding information, preceding vehicle information on a preceding vehicle that travels in front of the host vehicle in a driving lane;
  calculate, based on the preceding vehicle information, effect information on a slipstream of the preceding vehicle; and
  perform control, based on the effect information, to display an effect of the slipstream of the preceding vehicle in an animation that moves from a preceding vehicle display unit that displays the preceding vehicle toward a host vehicle display unit that displays the host vehicle,
  wherein the processor is programmed to perform control to:
   display a moving speed of the animation faster as the effect of the slipstream becomes larger, and
   display a shape of a mark in the animation to be either (i) a straight line of which a number increases as an effect of slip stream increases or (ii) a straight line of which a length increases as an effect of slip stream increases.

2. The display control device according to claim 1, wherein the processor is programmed to perform-performs control to display the animation in a larger size as the effect of the slipstream becomes larger.

3. A display system comprising:
 the display control device according to claim 1; and
 a display unit that is provided in front of a driver's seat in a vehicle cabin and that displays an image controlled by the display control device.

4. The display control device according to claim 1, wherein the processor is programmed to perform control to display the shape of the mark in the animation to be the straight line of which the number increases as the effect of slip stream increases.

5. The display control device according to claim 1, wherein the processor is programmed to perform control to display the shape of the mark in the animation to be the straight line of which the length increases as the effect of slip stream increases.

* * * * *